United States Patent Office 3,240,491
Patented Mar. 15, 1966

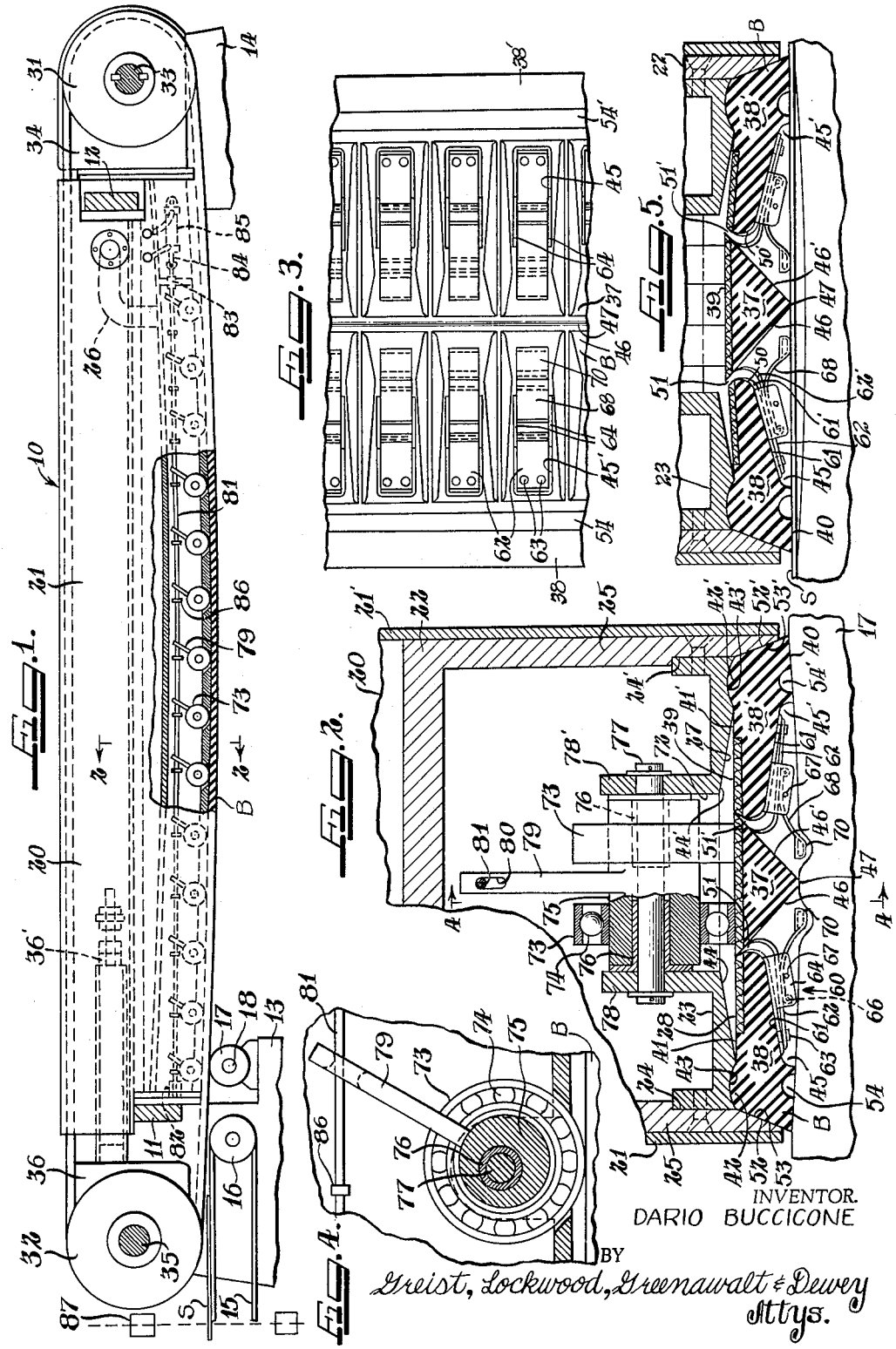

3,240,491
VACUUM BELT CONVEYOR
Dario Buccicone, Gary, Ind., assignor to Buccicone Engineering Co., Inc., Gary, Ind., a corporation of Indiana
Filed Nov. 19, 1963, Ser. No. 324,691
10 Claims. (Cl. 271—74)

This invention relates to article conveyors and is more particularly concerned with improvements in an overhead conveyor which employs suction for holding sheets or similar articles against the bottom surface of one or more traveling belts.

Overhead conveyors have heretofore been provided for handling sheets or similar articles in which the sheets are held in engagement with the bottom surface of traveling belts by suction applied through openings in the belts. Article conveyors of this type are shown in my Patent No. 2,973,960, dated March 7, 1961, and in my co-pending application Serial No. 279,798, Vacuum Belt Type Conveyor, filed May 13, 1963. These conveyors comprise one or more traveling belts which are supported on pulleys at the ends of an elongate frame and which traverse a slotted or open bottom of a vacuum chamber with the belts having slits which are opened as the sheet or other article being conveyed advances along the bottom of the conveyor so as to hold the sheet thereon until it reaches a piler box or other discharge area where the openings in the belts are closed to cut off the suction and the sheet is released for deposit on a pile or the like. A general object of the present invention is to provide a conveyor of this type which embodies a simplified construction and which operates efficiently and economically.

A more specific object of the invention is to provide an article conveyor which comprises an endless traveling belt supported on spaced end pulleys with its lower run traveling beneath an apertured vacuum chamber, the belt being provided with slit-like openings which are normally closed and which are automatically opened upon a sheet or similar article being fed into engagement with the bottom surface of the belt so as to form connecting passageways with the apertures in the vacuum chamber through which suction is applied to the article to hold the article on the surface of the belt for advancing movement with the same.

A further object of the invention is to provide an overhead conveyor which comprises an elongate supporting frame, an article carrying belt having a plurality of spaced slits, which belt is mounted on spaced end pulleys on the supporting frame, a vacuum chamber having bottom openings over which the belt travels and mechanism for holding the belt in a predetermined path which is automatically operated by advance of the article being carried and which permits the belt sections to be moved relative to each other so as to provide passageways through the belt slits which connect with the openings in the vacuum chamber whereby suction is applied to the top surface of the article sufficient to hold the article in engagement with the bottom face of the belt.

Another object of the invention is to provide an overhead conveyor which comprises a supporting frame, one or more article carrying belt members supported on end pulleys on the frame and a vacuum chamber with openings over which the belt members travel, together with mechanism which is automatically operated by advance of the article being carried to move one or more sections of the belt relative to adjoining sections of the belt so as to provide a passageway between the belt sections for applying sufficient suction to the surface of the article to retain the same in engagement with the lowermost surface of the belt.

A still further object of the invention is to provide an overhead conveyor for sheets or similar articles which comprises an elongate supporting frame, a belt assembly supported on end pulleys on the frame and having a bottom run thereof traveling beneath an apertured vacuum chamber, the belt assembly including apertures which are normally closed when no article is being carried, spring mechanism for automatically displacing successive belt sections when an article is fed thereto, thereby opening passageways between the belt sections for application of suction through the apertures to hold the article in engagement with the bottom surface of the traveling belt, and control means for restoring the displaced belt sections when the article is advanced to a predetermined point to close the passageways and to release the article for deposit beneath the conveyor.

These and other objects and advantages of the invention will be apparent from a consideration of the conveyor apparatus which is shown by way of illustration in the accompanying drawings wherein:

FIGURE 1 is a side elevation of a sheet piling apparatus having an overhead conveyor which embodies therein the principal features of the invention, portions of the apparatus being broken away;

FIGURE 2 is a transverse section taken on the line 2—2 of FIGURE 1, to an enlarged scale and with portions broken away;

FIGURE 3 is a fragmentary view, to an enlarged scale, of a portion of the bottom face of the conveyor;

FIGURE 4 is a fragmentary section taken on the line 4—4 of FIGURE 2; and

FIGURE 5 is a fragmentary section similar to FIGURE 2 with the conveyor carrying a sheet of material.

Referring first to FIGURES 1 and 2, there is illustrated a portion of a sheet handling apparatus which includes a rail-type overhead conveyor 10 having embodied therein the principal features of the invention. The illustrated apparatus is particularly adapted for handling sheets of relatively light material such as aluminum. However, it may be employed to handle sheets of other material such as rigid plastic, stainless steel, cold rolled steel, copper, brass, etc.

The conveyor rail unit or assembly 10 is supported at its opposite ends on cross beams 11 and 12 which are in turn supported on end stands 13 and 14. Only one conveyor rail unit 10 is shown but it will be apparent that several could be supported side by side on the same cross beams 11 and 12, the number depending upon the width of the sheets or other articles to be handled. A feeding conveyor for delivering sheets S or other articles to the underside of the conveyor unit 10 has its delivery end supported on pulley 16 which is in turn supported on suitable bearing brackets (not shown) on the stand 13. A sheet feeding roll 17 is supported on a shaft 18 which is in turn mounted on the stand 13 beneath the receiving end of the conveyor unit 10 so that the roll 17 is normally in engagement with the bottom surface of the conveyor unit 10 as shown in FIGURE 2 and is adapted to guide the leading endl of a sheet S into engagement with the same. The illustrated apparatus when employed as a sheet piler will include an end stop mechanism and a back stop, neither of which is shown since they form no part of the present invention.

The conveyor unit or assembly 10 as illustrated in the drawings includes a main frame 20 consisting of vertically disposed, laterally spaced side plates 21 and 21' which are connected at their bottom margins by a downwardly facing channel member 22 welded or otherwise secured thereto. A belt guiding plate 23 is secured at its side edges in recesses or grooves 24 and 24' provided in the inside lower edges of the side flanges 25 and 25' of the channel member 22. The belt guiding plate 23 cooperates with the channel member 22, which has suitable end closures, to form a suction or vacuum chamber which is connected by a suitable conduit 26 at one end thereof to a vacuum line or pump (not shown). The belt guiding plate 23 has its bottom face 27 shaped to conform to the shape of the top or inside face 28 of an endless traveling belt formation or assembly B which is supported in guided relation on the bottom face of the plate 23. The belt assembly B which is of special construction will be hereinafter described.

The belt assembly B is mounted on supporting pulley formations 31 and 32 at opposite ends of the conveyor frame 20. The pulley formation 31 is mounted on a cross shaft 33 in a fixed housing 34 at the one end of the frame 20 and the shaft 33 is connected to a suitable power drive (not shown). The pulley formation 32 at the other end of the frame 20 is mounted on a cross shaft 35 in a horizontally movable housing 36. The housing 36 is supported on frame 20 for horizontal sliding adjustment and the mounting includes a tension applying device indicated at 36' so as to control the tension in the belt B.

The belt assembly B is characterized by being molded of rubber or like material as a single unit which is subdivided into three parallel parts or belt sections consisting of a center belt section or member 37 and two adjoining side sections or belt members 38 and 38' extending along opposite edges of the center belt member 37 and initially formed integral with the latter. A reinforcing strip 39 of fabric or similar material extends on the back face of the belt throughout its length. The bottom face 40 of the lower or outside run of the entire belt assembly B is in a common plane which is horizontal in the open, article gripping and carrying position as shown in FIGURE 5. In the closed, non-gripping position as shown in FIGURE 2, bottom face 40 of the belt assembly B is in a common plane which has a relatively small convex curvature or which is bowed downwardly about the longitudinal axis. The bottom face 40 is also bowed somewhat in the longitudinal direction due to the curvature of the main frame of the conveyor as shown in FIGURE 1, this curvature being provided to compensate for sag in the lower run of the belt assembly B. The uppermost faces 41 and 41' of the belt side sections or members 38 and 38' are provided along their outer margins with upwardly projecting guide ribs or shoulders 42 and 42' which are received in cooperating guide recesses 43 and 43' on the bottom face 27 of the belt supporting and guiding plate 23. The plate 23 is cut away at 44 and 44' so as to provide upwardly and inwardly slanting surfaces allowing room for vertical movement of portions of the belt assembly B.

The belt assembly B is provided on its bottom face 40 with longitudinally spaced, transversely extending recesses 45 and 45' which recesses are arranged in longitudinally spaced pairs with the respective recesses of each pair thereof being in transverse alignment (FIGURE 3). The recesses 45 and 45' of each pair thereof extend inwardly to wall formations 46 and 46' which extend outwardly and upwardly in inclined relation from spaced points on the surface 40 of the assembly so as to leave an intervening portion 47 of the surface 40 which constitutes the bottom surface of the center belt section 37. The upwardly inclined wall formations 46 and 46' terminate at the upper or inner edges of the reversely curved inner portions of downwardly facing and outwardly directed curved wall formations 50 and 50' which form the top wall for the major portions of the recesses 45 and 45' and which extend to the outermost ends of the latter, adjacent the side edges of the belt assembly. The recesses 45 and 45' are connected with the vacuum chamber by passageway forming slits 51 and 51' which extend diagonally upwardly and outwardly through the web reinforcing material 39 of the belt at the upper or inner ends of the walls 50 and 50'. The slits 51 and 51' terminate at the junction of the top walls 41 and 41' of the side belt sections 38 and 38' with the center belt section 37. The slits 51 and 51' are formed so that when the belt assembly B is in the position shown in FIGURE 2, with the center belt section 37 in the lowermost position the slits 51 and 51' are closed and the belt assembly B forms a tight seal over the bottom face of the guide plate 23 and cooperates with the latter to form a bottom closure for the vacuum chamber 22. When the center belt section 37 is urged upwardly by pressure of a sheet S as in FIGURE 5, the slits 51 and 51' are opened up to form passageways connecting the recesses 45 and 45' with the vacuum chamber. The side belt sections 38 and 38' have inclined or tapered outer edges 52 and 52' which are adapted for engagement with the tapered inner edges 53 and 53' of the side walls 25 and 25' of the vacuum chamber forming channel member 22. Relatively narrow, longitudinally extending recesses 54 and 54' are provided in the belt face 40 adjacent the outer side marginal portions of the side belt sections 38 and 38' which improves the sealing between the belt assembly and the sheet S when the latter is engaged with the same.

A device for opening and closing each of the slits 51 and 51' is mounted in each of the recesses 45 and 45'. The slit opening and closing device 60 comprises two strip-like members 61 and 62 each having a curved end portion which provides the strip with a shape corresponding to the letter J. The strips 61 and 62 are formed of spring material such as stainless steel or spring steel and are secured together by one or more fasteners 63 which may also secure the two spring members in the recess 45. The spring strips 61 and 62 are positioned in the recess 45 with the strip 61 seated against the top wall 50 of the recess and with the curved ends 61' and 62' extending into the slit 51 and spaced as shown in FIGURE 2 so that the ends of the strips engage on opposite sides of the slit with the end 62' o fthe strip 62 engaging against the margin of the confronting wall 46 at the top thereof. The strip 61 has integral side plate portions 64 which are parallel and form with the body portion of the strip a U-shaped yoke opening downwardly in the recess 45 and carrying the pivot 66 and stop pin 67, both parallel with the body portion. The pivot 66 supports the end of a curved operating arm 68 which arm has its free end 70 reversely bent to provide a head forming portion which head forming portion 70 extends into the recess 45 in the direction of the longitudinal center line and bottom face of the belt assembly. A portion of the arm 68 adjoining the pivot 66 is seated against the bottom face of the strip 62 and the movement of the arm 68 in a clockwise direction, as viewed to the left in FIGURE 2, is limited by the stop pin 67. The head or finger portion 70, in the closed position of the belt extends somewhat below the curved bottom face 40 of the belt assembly B and preferably is rounded on the bottom side for engagement with a sheet S when the latter is fed to the conveyor. As shown in FIGURE 5, upward movement of the finger forming head portion 70 of the operating arm 68 swings the strip 62 toward the strip 61 and causes the end portions 61' and 62' to open up the slit 51. The raising of the operating strip 70 by engagement of the sheet S not only separates the ends 61' and 62' of the strips 61 and 62 but also causes the side section 37 of the belt to swing upwardly along its inner portion so as to further open up slit 51. The end portion 70 of the operating arm 68 preferably is coated with rubber, polyurethyne material or other suitable non-marking material so that the sheet or other article is not marred by engagement with the same.

The belt guiding plate 23 is provided with rectangular apertures 72 spaced longitudinally thereof which apertures are somewhat wider than the transverse width of the center belt section 37. The apertures 72 are arranged in the center of the plate 23 and aligned along the path of the center belt section 37. Two identical belt engaging rollers 73 are disposed in each of the apertures or openings 72. The rollers 73 are mounted in the same manner as in Patent No. 2,973,960, by means of roller bearings 74 on opposite ends of the sleeve member 75. The sleeve member 75 is in turn eccentrically mounted on end bearing sleeves 76 carried on a cross shaft 77. The cross shaft 77 is mounted at its ends in upstanding bracket formations 78 and 78' which project above the upper face of the plate 23 along the sides of the aperture 72. Each pair of rollers 73 is mounted in axially spaced relation on the supporting sleeve or hub 75 on the roller bearings 74 so that the rollers 73 rotate freely about the eccentrically mounted sleeve 75 while the latter is rotatable on the shaft 77 to raise and lower the rollers 73 in the aperture 72. The eccentrically mounted sleeve 75 is arranged on the shaft 77 so that upward pressure on the center belt section 37 will result in rotation of the eccentric sleeve in a direction to raise the rollers 73. An arm 79 extends radially of the middle of the sleeve 75 and in an upward direction. The arm 79 has an elongate axially extending slot 80 in its free end through which a control rod 81 extends. The control rod 81 is arranged in parallel spaced relation above the upper face of the belt guide plate 23 and extends longitudinally of the conveyor frame 20 with its opposite ends received in sliding relation in bearing members 82 and 83 in cross members at the ends of the belt guiding plate member 23. At the leading end of the conveyor the control rod 81 is shown connected to a piston 84 of the double acting hydraulic cylinder 85 which is operable to reciprocate the rod 81 horizontally. Any equivalent rod operating means may be employed. The control rod 81 carries a series of abutment or stop members 86 each of which is located adjacent an upstanding arm 79 in the direction of the sheet receiving end of the conveyor. The arms 79, slots 80, control rod 81 and stop members 86 cooperate to lower the rollers 73 and return the middle belt section 37 to its lowered or closed position when the cylinder 85 is operated to move the control rod in the direction toward the leading or discharge end of the conveyor.

In operating the apparatus as illustrated, successive sheets S are delivered by the feeding conveyor 15 and the leading edge of each successive sheet S is guided between the roller 17 and the bottom face of the traveling belt assembly B, the roller 17 being resiliently mounted so as to permit passage of the sheet S between the same and the belt. An electric eye 87 at the entrance end of the machine controls the operation of the cylinder 85. As the leading edge of the sheet S passes the electric eye 87 the cylinder 85 is operated to move the rollers 73 upwardly and relieve the pressure on the center belt section 37. As the leading end of the sheet S is advanced by the belt it engages and lifts the end portions 70 of successive operating arms 68 so as to open the slots 51 and 51' successively and permit suction to be applied to the entire portion of the sheet which is advanced over the roller 17. When the trailing end of the sheet S advances beyond the roller 17 the succeeding portions of the belt assembly B are free to drop to the closed position. At the desired point of advance of the sheet S the cylinder 85 is operated by electric eye 87, actuated by passage of the trailing end of the sheet and the control rod 81 is drawn to the right to force the rollers 73 against the top surface of the center belt section 37 which lowers the latter and closes the passageways 51 and 51' cutting off the vacuum pull on the sheet so as to free the sheet and allow it to drop from the conveyor. The operation of the cylinder 85 may be triggered by the trailing end of the sheet S passing the electric eye or it may be timed to operate at a desired interval as the sheet advances. The control rod 81 may be actuated by the cylinder 85 to raise the rollers and free the belt assembly for operation by the next succeeding sheet when a preselected portion of the leading sheet S passes the electric eye 87. The belt is constructed so that the slits 51 and 51' will be substantially closed when the rollers 73 are in the raised position and there is no sheet pressing against the bottom face of the belt, it being necessary to raise the slot opening arms 68 for positive opening of the slots 51 and 51'.

While particular materials and specific details of construction have been referred to in describing the form of the apparatus illustrated, it will be understood that other materials and different details of construction may be resorted to within the spirit of the invention.

I claim:

1. An article conveyor comprising an elongate frame adapted to be disposed horizontally, a downwardly facing housing extending along the bottom of said frame and having an open bottom face, a belt guide on the bottom of said housing, a belt assembly supported on end pulleys on said frame and having the lower run thereof traveling along said belt guide beneath said housing, said belt assembly having a transversely curved bottom face and spaced longitudinal slits extending between the top and bottom faces which are adapted to open up upon engagement with the upper face of a sheet or other article which flattens the bottom face of the belt assembly and causes portions thereof to move upwardly, supplemental slit opening means comprising a pair of spring plates secured on the bottom face of said belt assembly and having hook formations on corresponding free ends which engage on opposite sides of said slits, means associated with each pair of said plates for forcing the hook formations apart to open the slits when the bottom face of the belt assembly engages with the sheet, a mechanism for normally holding the belt assembly against upward movement by applying pressure to the top face of the belt assembly, and a control device for said belt holding mechanism which is shiftable to release the belt holding mechanism and allow progressive upward movement of portions of the belt and opening of the slits therein.

2. An article conveyor comprising an elongate frame adapted to be disposed horizontally, a downwardly facing housing extending along the bottom of said frame and having an open bottom face, a belt guide on the bottom of said housing, a belt assembly supported on end pulleys on said frame and having the lower run thereof traveling along said belt guide beneath said housing, said belt assembly having a transversely curved bottom face and spaced longitudinal slits extending between the top and bottom faces which are adapted to open up upon engagement of the bottom face of the belt assembly with a sheet or other article which flattens the bottom face of the belt assembly and causes center portions thereof to move upwardly, means for opening said slits which comprises a pair of spring plates connected at one end to the bottom face of the belt assembly and having hook formations on adjacent free ends which are positioned to engage with the belt assembly on opposite sides of each of said slits, a spring arm connected to each pair of said spring plates and extending below the lower face of the belt assembly where it is engaged by a sheet or other article fed to the conveyor and which is adapted to urge the spring plates upwardly to open the slits, a mechanism for normally holding the belt assembly against upward movement by applying pressure to portions of the top face of the belt assembly, and a control device for said belt holding mechanism which is shiftable to release the belt holding mechanism and allow progressive upward movement of center portions of the belt assembly and opening of the slits.

3. A conveyor assembly comprising an elongate supporting frame adapted to be disposed horizontally, a vacuum box in said frame and having a downwardly opening bottom face, spaced end pulleys in said supporting frame, a belt assembly supported on said end pulleys with its lower run forming a closure for the bottom face of said vacuum box, said belt assembly being constructed so that it has a downwardly bowed lower face along said lower run and a plurality of relatively short, longitudinally extending slits between the lower and upper faces thereof which are normally closed but which are adapted to be opened up so as to form vacuum passageways, pairs of spring plates mounted adjacent each of said slits on said lower face, said plates having free ends which are engaged on opposite sides of the slits and which are adapted to be moved apart by flexing of the plates to open up the slits, operating arms connected to each pair of spring plates and having portions projecting below the lower face of the belt for engagement with the upper surface of a sheet or other member to be conveyed when the latter is advanced into engagement with said belt assembly whereby portions of the belt assembly are raised and the slits are progressively opened as the sheet advances so that the sheet is held on the assembly by vacuum, and a mechanism for engaging the top face of the belt assembly and holding said assembly in its normal condition with the slits closed, which mechanism is operative to release successive portions of the belt in response to advance of a sheet into engagement with the bottom face of the lower belt run.

4. A vacuum belt type conveyor comprising an elongate support frame adapted to be disposed in a generally horizontal position, a vacuum box mounted on the bottom of said support frame with an open bottom face, end support pulleys spaced longitudinally of said support frame, a vacuum belt assembly mounted on said end support pulleys with its lower run normally closing the open bottom face of the vacuum box, said belt assembly having passageway forming slits extending between its article carrying outer face and its inner face which open and close in response to pressure on said faces, releasable means for applying pressure to the top face of said lower belt run so as to close said passageways, means to release said pressure applying means, and means to open said slits which comprises pairs of spring plate members connected at one end to the belt and having their opposite ends positioned at opposite sides of each slit and an operating member for each pair of plate members which projects below the bottom face of the lower run of said belt assembly when there is no article being carried and which is retracted so as to separate the plate members and open the slits upon engagement with the top surface of an article carried on the bottom face of said belt assembly.

5. An article conveyor comprising an elongate, generally horizontal frame, a downwardly extending housing mounted on said frame and having an open bottom, means forming a belt guideway in the bottom face of the housing, means connecting the housing with a source of vacuum, a traveling belt assembly having a plurality of parallel belt sections carried on spaced end supports mounted on said frame, said belt sections having their lower runs in adjoining relation in said guideway with the bottom faces thereof normally traveling in a transverse plane which is bowed downwardly about a longitudinal center axis, said belt sections being defined by longitudinally extending, longitudinally spaced slits which extend through the belt, said housing having its bottom face covered by the belt assembly in the normal arrangement of the belt sections, said belt assembly being so constructed that when one of said belt sections is moved vertically the slits between it and the adjoining belt section are opened up to form vacuum passageways through the belt, and a roller assembly mounted within the housing for controlling the vertical movement of the belt sections, said roller assembly comprising longitudinally spaced pairs of belt engaging rollers eccentrically mounted so that in their normal position they are held by gravity against one of said belt sections thereby preventing vertical movement and maintaining the slits in the belt assembly in closed condition, each pair of said rollers having an associated operating arm for controlling the eccentric movement of said rollers, a slide bar having means for engaging the operating arms so as to hold them with the rollers positioned to depress said one belt section, and opening elements associated with each of the slits which engage with the belt on opposite sides of the slits and which are operated by an article received on the belt to open the slits while permitting the belt section to be raised by pressure of the article against the bottom face thereof.

6. A vacuum belt type conveyor comprising an elongate support frame adapted to be disposed in a generally horizontal position, a vacuum box mounted on the bottom of said support frame with openings in the bottom face, belt supporting end pulleys spaced longitudinally of said support frame, a vacuum belt assembly mounted on said pulleys with its lower run normally closing the openings in the bottom face of the vacuum box, said belt assembly having passageway forming longitudinal slits extending between its article carrying outer face and its opposite inner face which slits open and close in response to pressure on the oppositely disposed faces of said belt assembly, releasable means for applying pressure to the inner face of said belt assembly so as to normally hold said passageways closed and means to release said pressure applying means, said belt assembly having recesses in the outer face thereof and said slits terminating in said recesses, and means to open said slits which comprises pairs of spring plate members seated in said recesses, each pair of said plate members being fixed at one end in a recess and having the opposite end edges positioned at opposite sides of a slit and an operating arm member for each pair of plate members which is pivotally mounted at one end in the recess and has its free end projecting beyond the outer face of said belt assembly when there is no article being carried thereon, said arm having an intermediate portion engaging the plate members and adapted to force the free ends thereof apart so as to open the slits upon engagement with the surface of an article moved against the outer face of said belt assembly.

7. An article conveyor comprising an elongate, generally horizontal frame, a downwardly extending housing mounted on said frame and having openings in the bottom thereof, means forming a belt guideway in the bottom face of the housing, means connecting the housing with a source of vacuum, a traveling belt assembly having a plurality of parallel belt sections carried on spaced end supports on said frame, said belt sections having their lower runs in adjoining relation in said guideway and providing a lower face normally traveling in a plane which is bowed downwardly about a longitudinal center axis, said belt sections being separated by longitudinally extending, longitudinally spaced slits, said housing having the openings in its bottom face closed in the normal arrangement of the belt sections, said belt assembly being so constructed that when one of said belt sections is moved vertically relative to an adjoining section while traversing the lower run slits are opened between said belt sections to form vacuum passageways, and a roller assembly mounted within the housing for controlling the vertical movement of the belt sections, said roller assembly comprising an elongate frame having spaced pairs of belt engaging rollers eccentrically mounted thereon so that in their normal position they are held by gravity against the upper face of the lower run of the belt assembly thereby preventing vertical movement thereof and maintaining the slits in the belt assembly in closed condition, each pair of said rollers having an associated operating arm for controlling the eccentric movement of said rollers and means for moving the operating arms to selectively free the rollers or hold them in belt depressing position, and pivoted opening elements associated with each of the slits which engage portions of the belt on opposite sides of the slits and which are moved by an article received on the outer face of the belt to automatically open the slits as the article advances.

8. An article conveyor comprising an elongate, generally horizontal rail-like frame, a downwardly opening housing mounted on said frame, means forming a belt guideway in the bottom face of the housing, means connecting the housing with a source of vacuum, a traveling belt assembly having a plurality of parallel belt sections carried on longitudinally spaced end supports mounted on said frame, said belt sections having their lower runs in adjoining relation in said guideway so as to cover the bottom face of the housing and providing a lower face normally traveling in a plane which is bowed downwardly about a longitudinal center axis, said belt sections being defined by parallel lines of longitudinally extending, longitudinally spaced slits, the belt sections at the edges of the assembly having longitudinally spaced, transverse recesses which extend to a line of said slits and slit opening means in each of said recesses, and means mounted within the housing for normally preventing relative movement of said belt sections out of the normal plane of travel along said lower run whereby to maintain the slits in the belt assembly, and pivoted means connected with each of the slit opening means which is swung by engagement with an article received on the lower face of the lower run of the belt assembly to open the slits as the article is advanced by the belt assembly.

9. A vacuum belt for a conveyor of the type which comprises an elongate support frame adapted to be disposed in a generally horizontal position, a vacuum box mounted on the bottom of said support frame with an open bottom face and belt supporting end pulleys which are spaced longitudinally of the support frame so that the lower run of the belt, when mounted on the pulleys, will normally close the open bottom face of the vacuum box, said vacuum belt having longitudinally spaced slits extending between its article carrying outer face and its inner face which open and close in response to pressure applied to said faces in a direction normal to the plane of the bottom run of said belt, and supplemental means to open said slits mounted on said belt which comprises pairs of spring plate members connected at one end to the outer face of the belt and having their opposite ends positioned at opposite sides of each slit, and an operating member for each pair of plate members which has a portion thereof projecting outwardly of the outer face of said belt when there is no article being carried and which is depressed inwardly so as to separate the plate members and open the slits upon enegagement with the surface of an article fed to the outer face of said belt.

10. A vacuum belt for a conveyor which is characterized by an elongate rail-like support frame adapted to be disposed in a generally horizontal position with a vacuum box mounted on the bottom of said support frame having an open bottom and belt supporting end pulleys spaced longitudinally on said support frame, said vacuum belt being adapted to be mounted on said end pulleys with its lower run normally closing the bottom of the vacuum box, said vacuum belt having parallel lines of slits extending between its article carrying outer face and its inner face which open and close in response to pressure on the oppositely disposed faces in a direction normal to the plane of travel thereof, and means to apply pressure to the belt material on opposite sides of the slits to open said slits which comprises pairs of elongate spring plate members anchored at one end to the outer face of the belt and having their opposite ends engaging at opposite sides of each slit and an operating arm member for each pair of plate members which is pivotally mounted at one end with the opposite end projecting beyond the outer face of said belt when there is no article being carried and which is forced in the direction of the inner face of the belt so as to engage an intermediate portion thereof with said plate members and force the belt engaging ends apart thereby opening the slits upon engagement of the projecting end of said operating arm member with the surface of an article carried on the outer face of said belt.

References Cited by the Examiner
UNITED STATES PATENTS 2,973,960  3/1961  Buccicone _____ 271—74

M. HENSON WOOD, JR., *Primary Examiner.*